United States Patent [19]
Giocoechea

[11] 3,864,440
[45] Feb. 4, 1975

[54] HUMIDIFIER AND HEATER FOR DELIVERED GAS

[75] Inventor: George Giocoechea, Chicago, Ill.

[73] Assignee: Respiratory Care, Inc., Elk Grove Village, Ill.

[22] Filed: Aug. 2, 1973

[21] Appl. No.: 384,940

Related U.S. Application Data

[63] Continuation-in-part of Ser. No. 219,697, Jan. 21, 1972, Pat. No. 3,757,082.

[52] U.S. Cl. ............... 261/122, 128/192, 219/271, 261/142, 261/DIG. 65
[51] Int. Cl. .................. B01f 3/04, A61m 15/00
[58] Field of Search ........... 261/DIG. 65, 122, 123, 261/142, 114 R, 121 R; 128/192, 186; 219/271

[56] References Cited
UNITED STATES PATENTS

| | | | |
|---|---|---|---|
| 1,648,547 | 11/1927 | Goodfellow | 128/192 X |
| 2,522,718 | 9/1950 | Huck | 128/192 X |
| 3,319,945 | 5/1967 | Person | 261/122 X |
| 3,429,676 | 2/1969 | Gatza | 261/123 X |
| 3,434,701 | 3/1969 | Bauer | 261/114 R |
| 3,489,506 | 1/1970 | Galstaun et al. | 261/114 R |
| 3,516,647 | 6/1970 | Jaffe et al. | 261/24 |
| 3,525,309 | 8/1970 | Katz | 261/114 R X |
| 3,561,444 | 2/1971 | Boucher | 128/194 |
| 3,572,660 | 3/1971 | Mahon et al. | 261/DIG. 65 |
| 3,757,082 | 9/1973 | Goicoechea | 261/DIG. 65 |

FOREIGN PATENTS OR APPLICATIONS

| | | | |
|---|---|---|---|
| 48,277 | 12/1888 | Germany | 261/123 |

Primary Examiner—Tim R. Miles
Assistant Examiner—Richard L. Chiesa

[57] ABSTRACT

A humidifier for delivered gases which has a water container with a cover provided with a gas inlet and a gas outlet, both inlet and outlet being further provided with removable tubing adaptors. A gas conveying assembly is within the water container, and includes a delivery tube which adjoins the inlet and which also extends below a diffuser plate to a rebound chamber between the bottom of the water container and the diffuser plate. A plurality of apertures in the diffuser plate have an aggregate area which is substantially equal to the area of the discharge, said apertures being spaced from said discharge in a pattern of aligned linear radial rows and concentric rows. The cover of the humidifier is also provided with a pressure relief valve which opens when predetermined pressure levels are exceeded within the container, and which can be closed in the event high pressure humidification is desired.

8 Claims, 7 Drawing Figures

PATENTED FEB 4 1975
3,864,440
SHEET 2 OF 2
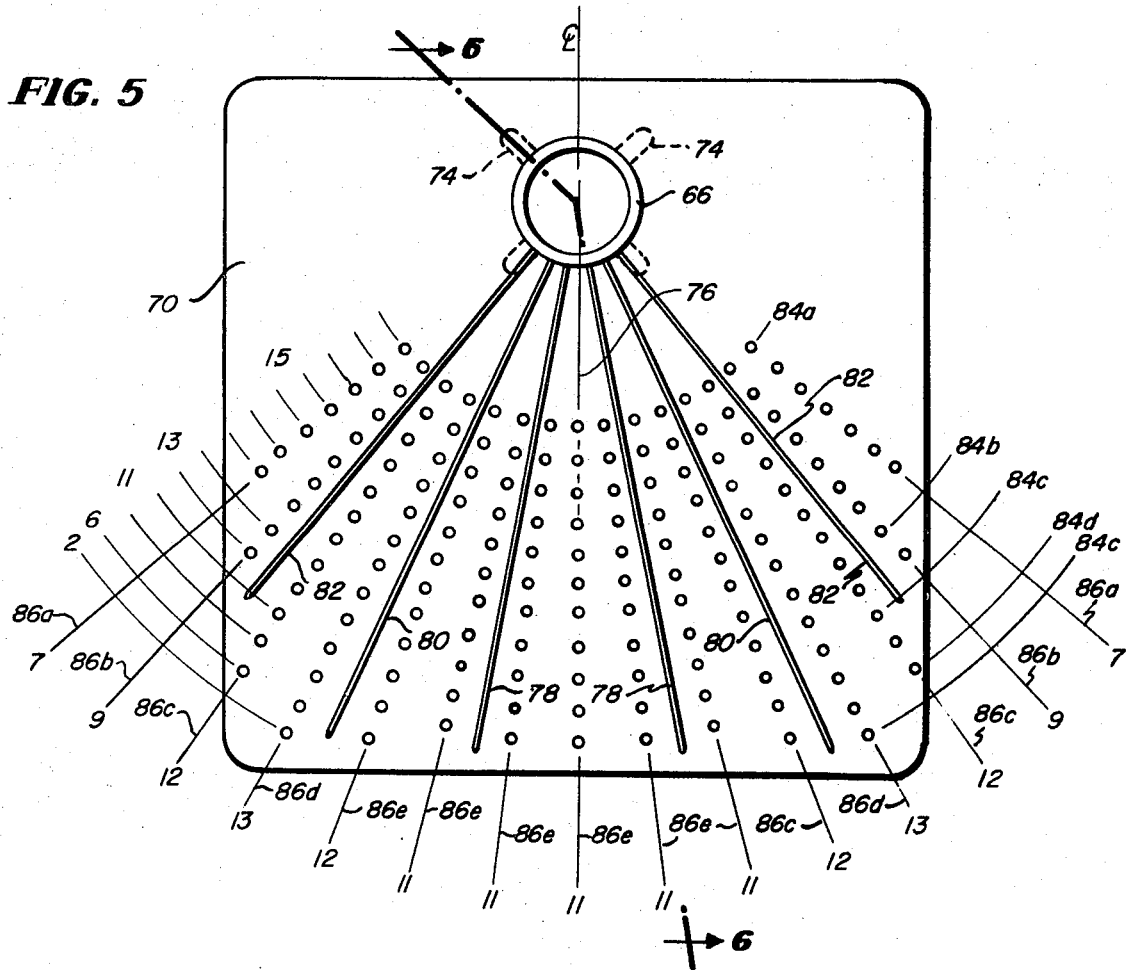
FIG. 5
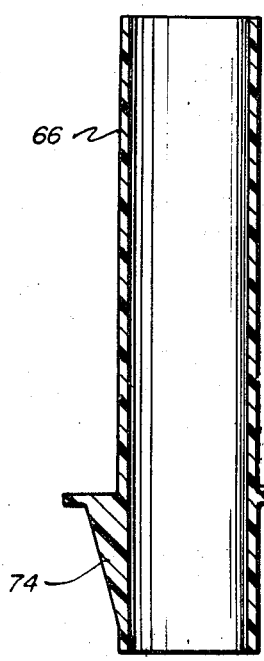
FIG. 6
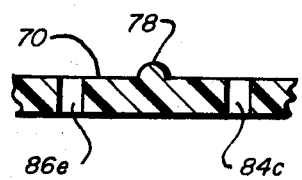
FIG. 7
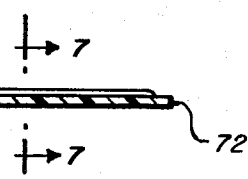

HUMIDIFIER AND HEATER FOR DELIVERED GAS

This application is a Continuation-In-Part of copending U.S. Pat. application, Ser. No. 219,697, filed Jan. 21, 1972, by the same applicant now U.S. Pat. No. 3,757,082.

This invention relates to an improved humidifier for delivered gases, such as from a respiratory machine. The invention particularly relates to an improved humidifier which has advantages of better humidification and a wide range of flow rates and effective temperature control.

Such copending application taught the art the use of an improved humidifier which could be produced at a low cost per unit so that it could be disposed, even though means were provided for electrically heating the water in the container. Such humidifiers are recognized in the art of inhalation therapy, particularly for the desired functions of humidifying delivered gases such as oxygen or a mixture of air and oxygen, as well as desirably heating the water in such container to levels approximating body temperature.

The humidifier disclosed in the copending application included a gas diffusing plate within the water container which was spaced form the bottom. A rebound chamber for the delivered gases was therefore provided between the plate and the bottom of the water container, and the gases rebounded upwardly through a plurality of apertures in such a plate for discharge through the outlet of the humidifier. The present invention relates to improved features of such a diffuser plate, as well as the delivery tube associated therewith. The invention also relates to other improved features relating to attaining greater versatility in the use of the inlets and outlets, as well as providing additional safety features and improved efficiency of operation.

It is more particularly an object of the present invention to provide a humidifier for inhalation therapy which attains higher levels of relative humidity at higher flow rates of delivered gases.

It is another particular object of the present invention to provide a humidifier for inhalation therapy by providing a water-gas-water interface within the humidifier for improved humidification and temperature control; in particular, a higher temperature operates within the first body of water to which the delivered gases are introduced and a lower, safer temperature operates in the second body of water through which the gas is subsequently moved prior to discharge.

It is still yet another particular object of the present invention to provide a humidifier for inhalation therapy which includes auxillary features of safety and versatility relating to pressure levels of the container, delivery of the fluids into the container and discharge of fluids from the container.

It is yet still another particular object of the present invention to provide a humidifier for inhalation therapy which enjoys the advantages described, and which additionally retains, the advantages of low cost to allow disposal of the entire unit.

Such objects are now attained together with still other objects which will occur to practitioners from time to time upon consideration of the present invention described in detail in the following disclosure, which include drawings wherein:

FIG. 5 is a plan view of an improved gas conveying assembly used in the humidifier;

FIG. 6 is a sectional view taken along line 6—6 in FIG. 5; and

FIG. 7 is a sectional view in portion and on an enlarged scale taken along line 7—7 in FIG. 6;

Figure 1:
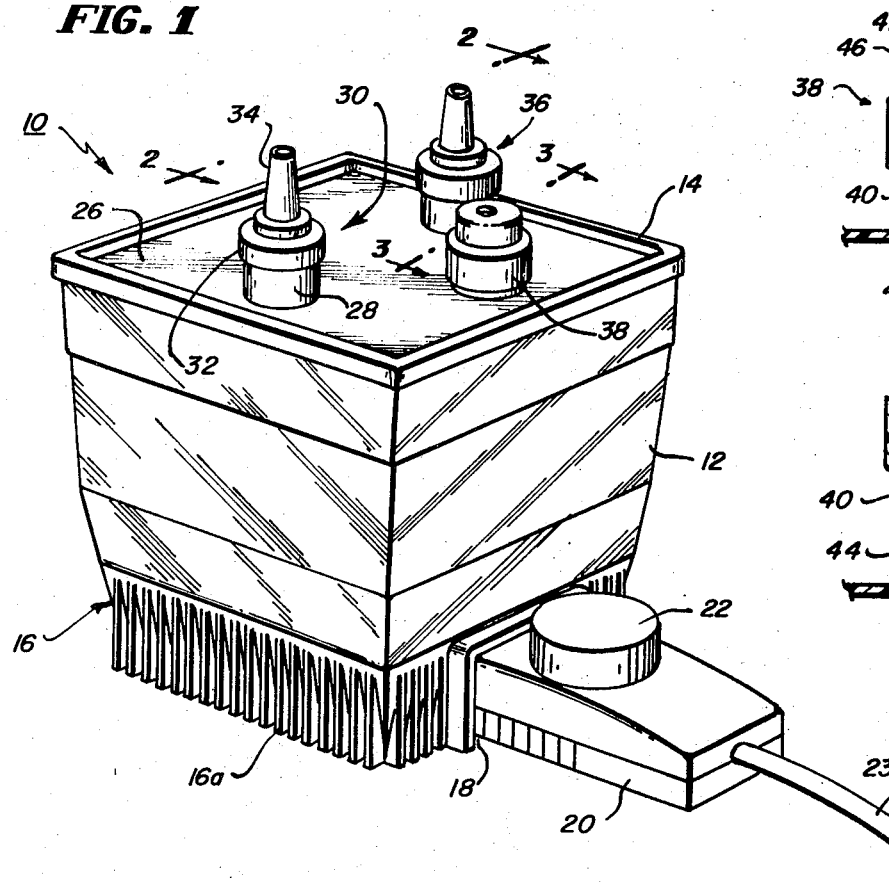
FIG. 1 is a perspective view of the improved humidifier.
Figure 3:
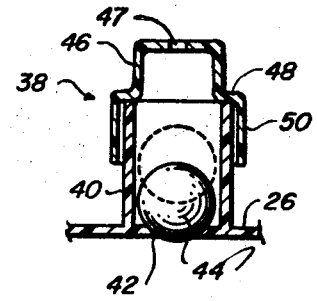
FIG. 3 is a sectional view of the pressure relief valve, on an enlarged scale, indicating the open position.

FIG. 1 in the drawing shows a combination of a humidifier and heater shown generally as 10. Such a combination includes a water container 12, a cover assembly shown generally as 14, and a heating housing assembly shown generally as 16. The side walls of the heating housing have a plurality of fins 16a to facilitate heat dissipation.

The heating housing is of the type described in the copending application previously identified, and reference is made herein only to those elements which help the practitioners to better understand the present invention. The heating housing is of the electrical resistance heating type and includes a socket plug 18 which is of the male type, having connectors 19. A female type pluge 20 is adapted to engage the socket, and such plug is provided with a thermostatic control 22. A portion of the electric cord 23 is indicated, and such is conventionally connected to available alternating current sources. The heating housing may be separable from the water container or may be secured to such a container by bonding or the like, as described more fully in the copending application above identified. The illustrated heating housing in the sectional view is shown as including insulating fibrous material 24 which is held in place by buttons 24a formed in the bottom of the heating housing. The heating housing is otherwise provided with electrical resistance heating elements as well as the necessary conductors and the like, which are not, however, shown.

The cover 14 of the humidifier is shown as including a planar top 26, and on this top is found a gas outlet shown generally as 28. The gas outlet is shown as a tubular projection integrally formed with the planar top. A tubing adaptor 30 is removably positioned on such a tubular projection, and such an adaptor is provided with a base member 32 which frictionally engages the outside of the tubular projection. The adaptor further has a tapered nozzle 34 which serves as a nipple fitting for flexible tubing frictionally secured thereto. The planar top also has a fluid inlet 36 through which both gas and water are introduced into the water container 12. This inlet is also in the form of tubular projection, and is likewise fitted with a removable tubing adaptor 36, of the same construction as tubing adaptor 30.

The planar top additionally is provided with a pressure relief valve shown generally as 38. This relief valve is of the "pop off" type which opens when predetermined pressure levels are exceeded within the water container. The pressure relief valve has a valve housing with a continuous side wall 40, which encloses an opening 42, having a concave edge to seat a ball valve 44. The pressure relief valve also includes a closure having a reduced diameter cap member 46 provided with a vent 47. A continuous shoulder 48 joins the cap member to a continuous skirt 50 which frictionally engages the outside of the side wall 40 when the valve is in open position. The ball valve is preset because of its weight so that it is displaced to a position indicated in phantom in the view of FIG. 4 when pressure within the container exceeds a predetermined level, say, two psi. Such a pop off pressure level range is desirable at lower flow rates of about four liters per minute to about 12 liters per minute, as when using a mask, a cannula or during anesthesia administration.

Figure 4:
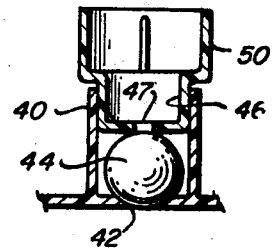
FIG. 4 is a view similar to that of FIG. 3, but showing the valve in closed position.

Substantially higher flow rates may be desirable in using the humidifier, suvh as with ventilation where 18-24 liters per minute of gas are delivered. The pressure of relief valve is then closed as shown in the view of FIG. 4. The removable closure is inverted and the reduced diameter cap member is inserted so it contacts the inside of the continuous side wall 40. In this position, the cap member holds the ball 44 against the opening 42 to maintain the pressure relief valve in closed position.

The cover assembly has a continuous bead 52, and such bead is provided with a coninuous groove seat 54 which closely engages the top edge 56 of continuous side wall 58 of the water container. In preferred practice, the cover assembly is secured to the water container by using a bonding material or the like. The water container has a bottom wall 60 which, together with the cover assembly 14, substantially encloses the water container 12.

The underside of the planar member 26 has a small annular projection 62, and this projection serves as a seat for a part of a gas conveying assembly shown generally as 64, in particular, upper end of delivery tube 66. The upper edge 68 of the tube contacts the underside of the planar top 26 and is securely held within the annular seat 62. A major portion or length of the delivery tube extends above a diffuser plate shown generally as 70. A minor portion or length of the delivery tube extends below the diffuser plate but stops short of the bottom wall 60 of the water container. It is preferred that the delivery tube and the diffuser plate be molded as a unitary assembly so that the relative disposition of the plate and the tube are fixed, as well as realizing evident economies.

The diffuser plate is shown as having the configuration of a four sided polygon, and the area and configuration of this polygon corresponds to the cross sectional configuration and area of the water container so that the continuous plate edge 72 contacts the side walls 58 of the water container. In corresponding manner, the water container is a four sided polyhedron.

The gas delivery tube is shown positioned adjacent one side of the diffuser plate, and a plurality of reinforcing gussets 74 are shown as being integrally molded with the tube and the plate. A bisecting axis 76 bisects the plate and the delivery tube by intercepting the side adjacent to the delivery tube and the side opposite thereto. The top side of the diffuser plate has a plurality of radiating and rounded ribs which are integrally molded with the plate for reinforcement relative to the pattern formed by the plurality of apertures across the diffuser plate. The ribs 78 immediately adjacent bisecting axis 76 are spaced 10° 30' from said bisecting axis. Ribs 80 are spaced 24° 30' from the axis, and ribs 82 are spaced 38°30' from the bisecting axis. The spacing of the ribs are preferably uniform for the embodiment illustrated, but the actual spacing is in no sense critical.

The plurality of apertures are provided in a pattern spaced away from the gas outlet 28, and it has been found that this is best served by providing a radiating pattern of the type illustrated. It has further been found that the aggregate area of the plurality of the apertures be substantially the same as the area of the outlet, that is, tubing adaptor 30. This is believed to result in a throttling or limiting effect so the inflow or outflow balance is not undesirably upset for given flow rates.

The pattern of the plate apertures follows radial rows, including a plurality of concentric radial rows, generally 84; and a plurality of linear radial rows, generally 86. The illustrated embodiment indicates a total of 161 apertures, including seven concentric rows 84a, having fifteen apertures; two concentric rows 84b each having thirteen apertures; two concentric rows 84c, each having eleven apertures; one concentric row 84d having six apertures; and one concentric row 84e having two apertures. Considering this distribution from another view, the shortest linear rows 86a have seven apertures at the opposite extremes of the radiating pattern. Adjacent inwardly are rows 86b which have nine apertures. Two linear rows 86c on each side of the bisecting axis have twelve apertures each. One linear row 86d on each side of the bisecting axis has thirteen apertures each; and a total of five linear rows 86e have eleven apertures each, including a row coincidental with the bisecting axis and two rows on each side of the bisecting axis.

Each of the illustrated apertures has the same size opening and each of the concentric rows are spaced from one another by a uniform distance; and each of the linear rows are spaced from each other by the same angular displacement. In the illustrate form, the linear rows are spaced from each other by about 7°. Merely by way of illustration, a diffuser plate having 161 holes, each hole 3/64 inch in diameter, would have a spacing between the concentric rows about 0.22 inch. A total of fifteen linear rows are present, seven on each side of the bisecting axis 76. There are three ribs 78 on each side of the bisecting axis, the ribs immediately adjacent the bisecting axis being spaced therefrom 10°30'. The second rib on each side of the bisecting axis is spaced 14° form the first rib; and the third rib is also spaced 14° from the second rib.

Figure 2:
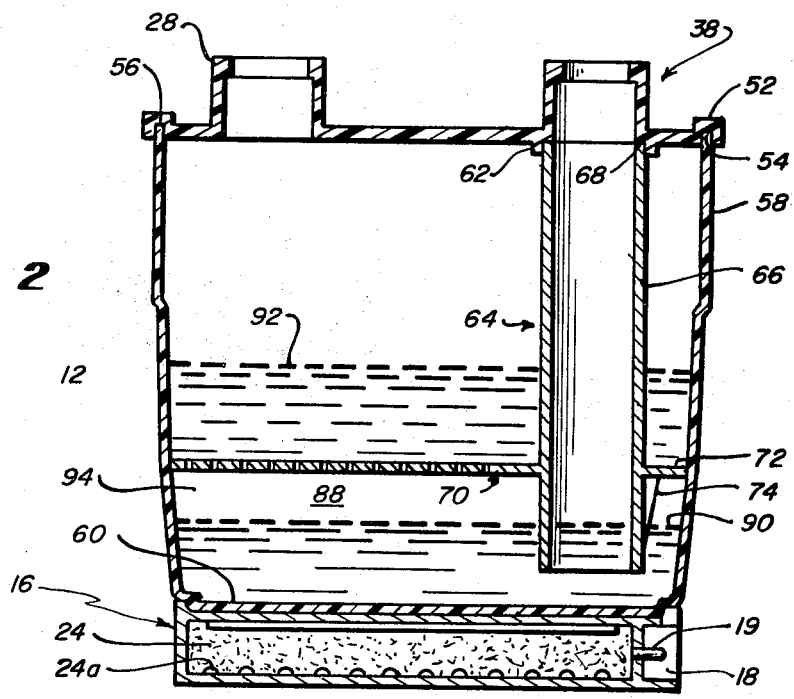
FIG. 2 is a sectional side view of the humidifier, with parts removed for purposes of clarity.

In operation, fluid in the form of water is deposited in the water container through the inlet 38 and through the delivery tube 66. Water fills the rebound chamber indicated generally as 88 and the level rises above the difuser plate 70. When fluid is introduced in the form of gas through the inlet, a water-gas-water interface is created as shown in the view of FIG. 2. One body of water in the rebound chamber has its level 90 below the diffuser plate 70; and a second body of water has its level 92 above the diffuser plate. Between the two bodies of water is a cushion or plenum of gas 94 which is under pressure. The higher the gas flow rate through the inlet, the more gas is pressured between the two bodies of water. The plenum of gas becomes larger with the higher flow rates and the relative humidity also increases with such higher flow rate. This is highly desirable since the highest possible relative humidity is required, especially at high flow rates where the patient is exposed to large volumns of gas.

The separated bodies of water also participate in assuring safe temperature levels of the gases discharged through the outlet. The body of water in the rebound chamber may be heated by electrical housing to temperatures of between 80°F to about 130°F. The introduced gas bubbles through this body of water, and then moves through the body of water above the diffuser plate which is at a lower temperature than the body of water in the rebound chamber, say 10° lower. The maximum temperature of 98°F can be controlled by the thermostat even when very short tubing of less than four feet is used between the outlet 28 and the patient. Extending the length of the tubing drops the temperature even further at the patient, which is an additional safety feature. In other words, a somewhat grossly controlled temperature range in the first body of water is still sufficient to maintain safe temperature delivery of the fluid to the patient because of the temperature drop by way of convection heating through the cushion of gas 94.

By way of further representative example, relative himidity output levels at different flow rates are illustrated in the following Table. For the purposes of this illustration, the humidifier may be viewed as contained about 250 ml of water in the rebound chamber and about the same volume of water above the diffuser plate. The diffuser plate is of the type previously described with 161 holes, each hole being 3/64 inch in diameter, and the apertures or holes in the concentric radial rows being spaced about 0.22 inch; and the linear rows being spaced about 7°.

| | | | | RELATIVE HUMIDITY OUTPUT FLOW/LITER/MINUTE | | | | | | | |
|---|---|---|---|---|---|---|---|---|---|---|---|
| | 3 | 4 | 5 | 6 | 7 | 8 | 9 | 10 | 11 | 12 | 13 | over |
| Non-Heated | 88 | 91 | 93.5 | 94.5 | 95.5 | 97.5 | 98.5 | 99 | 99 | 99.5 | 100 | 100 |
| Heated 100°F | 95 | 96 | 97.5 | 98.5 | 99 | 100 | 100 | 100 | 100 | 100 | 100 | 100 |
| Heated 105°F | 98 | 99 | 99.5 | 100 | 100 | 100 | 100 | 100 | 100 | 100 | 100 | |
| Heated 100°F | 100 | 100 | 100 | 100 | 100 | 100 | 100 | 100 | 100 | 100 | 100 | |

It is seen from the foregoing Table that at the very high flow rates, relative himidity attained 100 percent levels, even when not heated. Heating at 100°F resulted in reaching 100 percent relative humidity at flow rates of 8 liters per minute and higher. At 105°F, the 100 percent level was reached at 6 liters per minute; and at 110°F, the relative humidity level of 100 percent occured at three liters per minute.

The body of water below the difuser plate can be maintained at constant levels for given flow rates. When the water level 90 below the diffuser plate drops below the end of the minor portion of the delivery tube, the pressure will break against the gas plenum 94, and water will drop from above the diffuser plate to below the plate. This will cause the water level 90 to resume its previous point so that fluid delivery the tube 66 will again pressurize the gas plenum.

The gas cushion or plenum is believed to be important for attaining the improved relative humidity of the discharged gases since higher flow rates correspondingly increase the volume and pressure of the gas plenum. The existence of this plenum is assured by the minor portion of the delivery tube which extends below the diffuser plate a distance sufficient to obtain an operating gas plenum over the range of gas flow used in flow meters, anesthesia, ventilation and like types of inhalation therapy. Such distance is at least about ½ the depth of the rebound chamber.

Warm moist air is always necessary for the proper functioning of important ciliary activity in respiratory structures. The hair-like ciliary movement is a vital function in removing secretions and particulate matter which could be harmful to the patient. Dry gases can now be effectively warmed and humidified by the himidifier disclosed herein to prevent such impairment of ciliary movement and other consequent problems. These include thickening and encrustation of secretions with subsequent increased exposure to pulmonary infection in patients already at risk status.

It is preferred that the entire humidifier, except for electrical components and the ball valve, be formed from economical plastic material, particularly thermoplastics. The gas conveying assembly may be molded as a unit. It may then be positioned and secured to the sidewalls to the container. The cover and tubular projections may be molded, and the cover then secured to the top edge of the sidewalls. The tubing adaptors are also preferably molded as the housing portions of the heating housing.

The claims of the invention are now presented and the terms of such claims may be further understood by the reference to the language of the preceding specification and the views of the drawings.

What is claimed is:

1. A humidifier for delivered gases, including
   a water container having continuous sidewalls and a bottom wall,
   a top cover for the water container,
   an inlet on the cover for introduction of water and gas,
   an outlet in the cover for discharge of humidified gas, and
   a gas conveying assembly within said water container, said assembly having a gas delivery tube and a diffuser plate, said plate having a continuous edge extending to and contacting the sidewalls of the container to define a gas rebound chamber between the plate and the bottom of the container, the gas delivery tube having a major portion of its length extending from the plate to the inlet on the cover, and a minor portion extending below the diffuser plate but stopping short of the bottom, said minor length being operable to maintain a gas plenum between a body of water in the rebound chamber and a body of water above the plate, said body of water above the plate raising the level of water in the rebound chamber above the end of the minor portion of the tube when the level of the water in the rebound chamber falls below the end of said minor portion, thereby maintaining the gas plenum under pressure, said gas delivery tube joining said plate adjacent an edge portion, said outlet passage in the cover being above the plate adjacent an opposite edge portion, and said plate having a plurality of apertures spreading towards the remaining edge portions of the plate.

2. A humidifier for delivered gases which includes the features of claim 1 above, including an electrical heating housing dimensioned to receive the bottom wall of said water container and to support said water container while desired temperature levels are imparted to the water in said container.

3. A humidifier for delivered gases as in claim 2 above, wherein the total area of said apertures is substantially the same as the inside diameter of the outlet passage.

4. A humidifier for delivered gases which includes the features of claim 2 above, wherein said heating housing is affixed to the bottom of said water container to obtain a unitary humidifier and heater assembly.

5. A humidifier for delivered gases which includes the features of claim 1 above, wherein said gas outlet passage is formed by a tubular member and said gas and water inlet is likewise formed by a tubular member, and both the inlet and outlet having a removable tubing adaptor, each of said tubing adaptors having a tapered nozzle part for frictionally receiving flexible tubing for conveying gas to and from the humidifier.

6. A humidifier for delivered gases which includes the features of claim 3 above, wherein said gas diffuser plate has a continuous edge which defines as area and configuration that corresponds to a cross sectional area and configuration of said water container so that said continuous edge continually engages the continuous side walls of the water container, the long axis of said delivery tube being normal to the plane of said diffuser plate, said delivery tube passing through said diffuser plate adjacent a portion of the continuous edge of said diffuser plate, said plurality of apertures in the diffuser plate extending from said delivery tube in aligned radial rows towards edge portions remote from the edge portion adjacent to said delivery tube.

7. A humidfier fro delivered gases which includes the features of claim 6 above, wherein said diffuser plate is a four sided polygon, said delivery tube passing through said diffuser plate adjacent one of the sides of the polygon, a bisecting axis of said polygon intercepting said side adjacent said delivery tube and a side opposite thereto, the plurality of apertures in said radial rows including both aligned linear radial rows and concentric radial rows, the radial distances of said concentric rows being substantially uniform, and said linear radial rows being spaced from said bisecting axis by substantially uniform angular displacements 8. A humidifier for delivered gases which includes the feature of claim 7 above, wherein the continuous edge of said diffuser plate is secured to the side walls of the water container, and the top is likewise secured to a continuous upper edge of the water container, and wherein an electrical heating housing is secured to the bottom of the water container, said heating housing having plug means to receive a thermostatically controlled connection.

* * * * *